Figure 1:
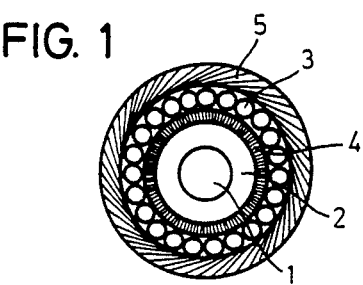

United States Patent [19]

Meistring et al.

[11] Patent Number: 4,516,831

[45] Date of Patent: May 14, 1985

[54] LIGHT CONDUCTING CABLE INCLUDING A HEAT REMOVABLE LAYER FOR PREVENTING TENSION AND A METHOD OF MAKING SAME

[75] Inventors: Rolf Meistring, Glonn; Hans-Friedrich Siegling, Egmating; Siegfried Pfahl, Hagen, all of Fed. Rep. of Germany

[73] Assignee: Heermann GmbH, Hagen, Fed. Rep. of Germany

[21] Appl. No.: 402,997

[22] Filed: Jul. 28, 1982

[30] Foreign Application Priority Data

Aug. 22, 1981 [DE] Fed. Rep. of Germany ....... 3133274

[51] Int. Cl.³ .................................................. G02B 5/14
[52] U.S. Cl. ............................. 350/96.23; 350/96.10; 174/10; 174/68 R; 174/101
[58] Field of Search ................... 350/96.10, 96.23; 174/10, 110 R, 113 R, 101, 102 R, 68 R

[56] References Cited

U.S. PATENT DOCUMENTS

| | | |
|---|---|---|
| 3,980,390 | 9/1976 | Yamamoto et al. .............. 350/96.33 |
| 4,000,936 | 1/1977 | Gloge ................................. 350/96.23 |
| 4,088,830 | 5/1978 | Wargin et al. .................. 174/113 R |
| 4,148,560 | 4/1979 | Margolis .......................... 350/96.23 |

FOREIGN PATENT DOCUMENTS

| | | | |
|---|---|---|---|
| 2944073 | 5/1981 | Fed. Rep. of Germany ... 350/96.23 |
| 3002498 | 7/1981 | Fed. Rep. of Germany ... 350/96.23 |
| 54-102593 | 8/1979 | Japan .................................... 174/10 |

*Primary Examiner*—William L. Sikes
*Assistant Examiner*—Brian M. Healy
*Attorney, Agent, or Firm*—W. G. Fasse; D. H. Kane, Jr.

[57] ABSTRACT

Undesirable attenuations are avoided in a light-conducting cable by providing a certain play between the coated light-conducting fiber and its outer protective casing which may include a reinforcing sheathing surrounding the coating and surrounded by an outer casing. Such play is achieved by temporarily providing a removable material radially inwardly, or in, or radially outwardly of the sheathing and then removing such temporary layer by chemically dissolving the layer, or melting, or evaporating the layer through the outer casing which is made permeable for this purpose.

12 Claims, 2 Drawing Figures

LIGHT CONDUCTING CABLE INCLUDING A HEAT REMOVABLE LAYER FOR PREVENTING TENSION AND A METHOD OF MAKING SAME

CLAIM TO PRIORITY

The present application is based on German Ser. No. P 31 33 274.9, filed in the Federal Republic of Germany on Aug. 22, 1981. The priority of the German filing date is claimed for the present application.

BACKGROUND OF THE INVENTION

The invention relates to a light-conducting cable which is especially useful for a remote-controllable flying body. The cable is, for instance, spooled onto a reel on the flying body and is unreeled during the flight. The invention also relates to a method for making such a cable.

Light-conducting cables of the mentioned type may be constructed similarly to standard communications cables. However, for the stated purpose, attention must be paid to having or achieving a small spool or coil volume, a small total weight, and sufficient tensile strength for the light-conducting cable. Cables of this type must be produceable in lengths of several kilometers and may not exhibit any high attenuation.

Relatively high attenuations, however, are already evident or occur at relatively light tension loads which are well below the breaking load of a light-conducting fiber. Such tension loads are unavoidable in prior art light-conducting cables when they are used for remote-controllable flying bodies. It is especially difficult to sheath relatively thin and long light-conducting fibers under tension- and compression-free conditions.

OBJECTS OF THE INVENTION

In view of the above it is the aim of the invention to achieve the following objects singly or in combination:

to maintain a low attenuation in a light-conducting cable used for the above stated purpose;
to construct a light conducting cable so that tension and/or compression loads to which the light-conducting cable may be exposed during its manufacture and subsequent use may not adversely affect the transmission characteristics of the cable;
to keep the outer diameter of the sheathed cable to less than or equal to 0.5 mm whenever possible; and
to provide a method for manufacturing a light-conducting cable having the above mentioned qualities.

SUMMARY OF THE INVENTION

The above objectives have been achieved in a light-conducting cable for a remote-controllable body, such as a flying body, wherein the light-conducting fiber is coated by a protective layer which in turn is covered or encased by an outer multi-layered casing having an armored sheathing. The outer casing of the light-conducting cable is permeable to a chemically soluable substance, or to a meltable substance, or to a vaporizable substance, which is applied between the protective layer and the outer casing of the light-conducting cable during the production of the cable, and which is removed at least partially during the completion of the cable through said permeable casing for providing a play or free space between the light-conducting fiber and the outer casing, whereby the fiber itself is free of tension and compression forces while it is still sufficiently centered in the outer casing, whereby disturbances of its transmission qualities are eliminated. Thus, a constant transmission of steering control signals is possible between a control panel and a moving body, such as a flying body, by means of electro-optical equipment, which is susceptable to less interferences than a prior art signal transmission through a wire cable.

According to the method of the invention a removable temporary layer is applied during the manufacture of the cable between the inner coating of the light conducting fiber and the reinforcing sheathing of the outer casing or inside said reinforcing sheathing or between the reinforcing sheathing and the outer casing, whereby the sheathing and the casing are made so as to be permeable to the material of which the removable temporary layer is made when such temporary layer is at least partially removed during the completion of the cable by chemically dissolving, or melting or evaporating the material of the temporary layer. The removal of the temporary layer or even its partial removal provides the desired play which keeps any tension and/or compression loads off the light conducting fiber whereby its transmission characteristics including its defined attenuation remain undisturbed by any tension and/or compression loads to which the cable may be exposed during its manufacture or subsequent use.

BRIEF FIGURE DESCRIPTION

Figure 2:
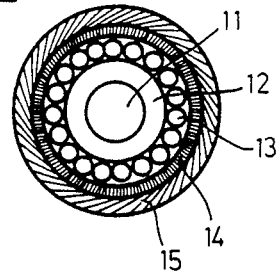

In order that the invention may be clearly understood, it will now be described by way of example, with reference to the accompanying drawings, wherein:

FIG. 1 is a sectional view through a light-conducting cable according to the invention with a removable layer still in place on the protective coating; and FIG. 2 is a sectional view similar to that of FIG. 1, but with the removable layer still in place between the reinforcing sheathing and the outer casing.

DETAILED DESCRIPTION OF PREFERRED EXAMPLE EMBODIMENTS AND OF THE BEST MODE OF THE INVENTION

A light-conducting fiber 1 or 11 is provided with a protective layer 2 or 12, which in turn is enclosed by an armored or reinforcing sheathing 3 or 13 substantially coaxially encircling the conductor with its coating. The reinforcing sheathing is, for instance, made of natural or manmade fibers having a high coefficient of elasticity and a high tensile strength.

The sheathing 3 or 13 is in turn surrounded by an outer casing 5 or 15. According to the invention a temporary, removable layer 4 of a chemically soluable, meltable, or vaporizable substance, e.g., polyvinylalcohol, gelatin, acrylic resin, wax or the like is arranged under, that is, radially inwardly of the reinforcing sheathing 3 as shown in FIG. 1. As shown at 14 in FIG. 2 the temporary removable layer may be arranged around or radially outwardly of the sheathing 13. In the alternative the material or substance of the layers 3, 13 may be arranged in the interstices between elements forming the sheathing 3 or 13. The term "radially" in this context has reference to a central, longitudinal axis of the present light conducting cable.

The outer casing 5, 15 is applied to the so prepared light-conducting cable and is composed of a braiding or winding of natural or manmade fibers. The outer casing 5 or 15 is permeable along its entire length to the dissolved, melted, or vaporized form of the substance in the removable layer 4 or 14. After the casing 5, 15 is applied, the layer 4, 14 is at least partially removed by using appropriate solvents or by raising the temperature for a melting or evaporating of the removable layer 4 or 14, whereby the substance of the removable layer 4 or 14 passes through the outer permeable casing 5 or 15 along its entire length to form a free space inside said outer permeable casing which free space was initially occupied by said removable layer 4 or 14. The application of a vacuum may be used to draw the substance of layer 4, 14 through the porous or permeable casing 5, 15 or also through the sheathing 3 in FIG. 1 so that the light-conducting fiber 1, 11 with its protective layer 2, 12, lies relatively loosely in the multi-layered casing to provide the above mentioned play or free space with the stated advantages.

Such a cable construction makes sure that any attenuation due to tension or pressure loads on the light-conducting fiber during the application of the individual layers of the casing and during completion of the cable is eliminated.

By using known technological coating and casing application steps the cable may be cost-effectively produced with a small diameter, and in relatively long lengths.

Although the invention has been described with reference to specific example embodiment it will be appreciated that it is intended to cover all modifications and equivalents within the scope of the appended claims.

What is claimed is:

1. A light conducting cable suitable for winding onto a reel and rapidly unwinding from the reel, comprising a light conducting optical fiber (1 or 11) centrally located in the cable, a protective coating (2 or 12) surrounding the light conducting optical fiber for protecting the fiber, an outer casing (5 or 15) surrounding said protective coating and a certain free space between said protective coating (2 or 12) and said outer casing (5 or 15) for preventing tension and/or compression loads from affecting the transmission characteristic of the cable, said cable further comprising a layer (4, 14) of heat removable material substantially entirely surrounding said light conducting optical fiber for a limited time inside said free space between said outer casing and said protective coating, and wherein said outer casing is permeable to said heat removable material of said layer substantially along the entire length of said outer casing for the removal or partial removal of said layer of heat removable material through the permeable outer casing substantially along the entire length of said cable for providing said free space inside said cable substantially along its entire length when said heat removable material of said layer (4, 14) has been removed through said outer casing by heating the cable.

2. The cable of claim 1, wherein said heat removable material of said layer is an evaporable material capable of passing through said permeable casing when said cable is exposed to heat.

3. The cable of claim 1, wherein said heat removable material of said layer is a meltable material capable of passing through said permeable casing when said cable is exposed to heat.

4. The cable of claim 1, further comprising a reinforcing sheathing (3, 13) for said outer casing.

5. The cable of claim 1, further comprising a reinforcing sheathing for said outer casing, said reinforcing sheathing being located between said protective coating and said outer casing.

6. The cable of claim 5, wherein said layer of heat removable material is located radially inwardly of said reinforcing sheathing prior to removal of said layer of heat removable material, and wherein said reinforcing sheathing is also permeable to said layer of heat removable material.

7. The cable of claim 5, wherein said layer of heat removable material is located radially outwardly of said reinforcing sheathing prior to removal of said layer of heat removable material.

8. The cable of claim 5, wherein said layer of heat removable material is located at least partially in interstices of said reinforcing sheathing.

9. A method of producing a light conducting cable, comprising the following steps: coating a light conducting fiber with a protective coating, enclosing said protective coating with a layer of heat removable material, surrounding said layer of heat removable material by an outer casing which is permeable substantially along its entire length to said heat removable material when the latter is heated, said outer casing protecting said light conducting cable, and heating said cable sufficiently for at least partially removing said heat removable material through said permeable outer casing substantially along the entire length of said cable to thereby provide a certain free space in said cable along its entire length to prevent tension and/or compression loads effective on said outer casing from affecting the transmission characteristic of the cable.

10. The method of claim 9, wherein said heating step involves subjecting the cable to a heat treatment at a temperature sufficient to melt the removable material out through said permeable outer casing substantially along the entire length of said permeable outer casing, said temperature being low enough to avoid adversely affecting the cable.

11. The method of claim 9, wherein said heating step involves heating said cable sufficiently for evaporating the heat removable material through said permeable outer casing substantially along the entire length of said permeable outer casing.

12. The method of claim 9, wherein said heat removable material is a polyvinylalcohol, or a gelatin, or an acrylic resin or wax.

* * * * *